under 35
U.S.C. 154(b) by 361 days.

(12) United States Patent
Swix et al.

(10) Patent No.: US 8,584,185 B2
(45) Date of Patent: Nov. 12, 2013

(54) SYSTEM AND METHOD FOR CONTENT TRANSMISSION NETWORK SELECTION

(75) Inventors: Scott R. Swix, Duluth, GA (US); Paul T. Watson, Alpharetta, GA (US); James H. Gray, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 361 days.

(21) Appl. No.: 12/191,444

(22) Filed: Aug. 14, 2008

(65) Prior Publication Data

US 2008/0307469 A1    Dec. 11, 2008

Related U.S. Application Data

(63) Continuation of application No. 10/028,153, filed on Dec. 20, 2001, now abandoned.

(51) Int. Cl.
| | | |
|---|---|---|
| H04N 7/173 | (2011.01) | |
| H04J 1/16 | (2006.01) | |
| H04J 3/14 | (2006.01) | |
| G06F 15/173 | (2006.01) | |

(52) U.S. Cl.
USPC .......... 725/93; 725/91; 725/92; 725/114; 725/115; 725/116; 370/238; 709/226; 709/227

(58) Field of Classification Search
USPC ......... 725/92, 93, 95, 96, 109, 110, 114, 116; 709/226, 227; 370/238
See application file for complete search history.

(56) References Cited

U.S. PATENT DOCUMENTS

| | | | |
|---|---|---|---|
| 5,555,441 | A | 9/1996 | Haddad |
| 5,608,446 | A | 3/1997 | Carr et al. |
| 5,659,539 | A | 8/1997 | Porter et al. |
| 5,699,107 | A | 12/1997 | Lawler et al. |
| 5,761,602 | A | 6/1998 | Wagner et al. |
| 5,790,935 | A | 8/1998 | Payton |
| 5,852,721 | A | 12/1998 | Dillon et al. |
| 5,914,712 | A * | 6/1999 | Sartain et al. ............ 725/9 |
| 6,016,307 | A | 1/2000 | Kaplan et al. |
| 6,052,715 | A | 4/2000 | Fukui et al. |
| 6,092,113 | A | 7/2000 | Maeshima et al. |
| 6,104,720 | A | 8/2000 | Kisor |
| 6,118,472 | A | 9/2000 | Dureau et al. |
| 6,195,692 | B1 | 2/2001 | Hsu |
| 6,426,959 | B1 | 7/2002 | Jacobson et al. |
| 6,438,110 | B1 | 8/2002 | Rai et al. |

(Continued)

FOREIGN PATENT DOCUMENTS

WO    WO 99/60790    11/1999

OTHER PUBLICATIONS

Huitema "Routing in the Internet" (Prentince Hall, 1995/2000) pp. 335-357.

(Continued)

*Primary Examiner* — Nasser Goodarzi
*Assistant Examiner* — Fred Peng
(74) *Attorney, Agent, or Firm* — Guntin & Gust, PLC; Ralph Trementozzi

(57) ABSTRACT

A content transmission selection system is disclosed. The content transmission selection system receives requests from viewers for specific video content items. Using characteristics of the designated content item, the content transmission selection system determines whether to transmit the content item over a broadcast network or a broadband network.

20 Claims, 4 Drawing Sheets

(56) References Cited

U.S. PATENT DOCUMENTS

| | | | |
|---|---|---|---|
| 6,510,556 B1 * | 1/2003 | Kusaba et al. | 725/93 |
| 6,560,221 B1 | 5/2003 | Hara et al. | |
| 6,631,413 B1 | 10/2003 | Aggarwal et al. | |
| 6,674,994 B1 | 1/2004 | Fell et al. | |
| 6,718,374 B1 * | 4/2004 | Del Sordo et al. | 709/220 |
| 6,766,526 B1 * | 7/2004 | Ellis | 725/57 |
| 6,868,452 B1 | 3/2005 | Eager et al. | |
| 6,885,675 B1 | 4/2005 | Gibbings | |
| 6,889,385 B1 | 5/2005 | Rakib et al. | |
| 6,961,430 B1 * | 11/2005 | Gaske et al. | 380/216 |
| 6,971,119 B1 * | 11/2005 | Arsenault et al. | 725/89 |
| 7,089,577 B1 * | 8/2006 | Rakib et al. | 725/87 |
| 7,284,261 B1 * | 10/2007 | Connelly | 725/140 |
| 7,305,357 B2 | 12/2007 | Hamilton | |
| 2002/0010920 A1 * | 1/2002 | Bertram | 725/25 |
| 2002/0026645 A1 | 2/2002 | Son et al. | |
| 2002/0087661 A1 | 7/2002 | Matichuk et al. | |
| 2002/0087694 A1 | 7/2002 | Daoud et al. | |
| 2003/0061619 A1 * | 3/2003 | Giammaressi | 725/95 |
| 2003/0163824 A1 * | 8/2003 | Gordon et al. | 725/90 |
| 2004/0172658 A1 * | 9/2004 | Rakib et al. | 725/120 |

OTHER PUBLICATIONS

Randell Hardware/Software Tradeoffs: A General Design Principle? p. 19-21 Jan. 25, 1985.

* cited by examiner

SYSTEM AND METHOD FOR CONTENT TRANSMISSION NETWORK SELECTION

RELATED APPLICATION

The present application claims the benefit of priority as a continuation of U.S. application Ser. No. 10/028,153 filed Dec. 20, 2001 now abandoned, the disclosure of which is hereby incorporated herein in its entirety by reference.

BACKGROUND OF THE INVENTION

1. Field of the Invention

The present invention relates to systems and methods for content transmission. More specifically, the invention relates to systems and methods for determining whether to transmit content using a broadcast network or a broadband network.

2. Description of the Prior Art

The demand for the quick and easy access to a wide variety of content which may be, for example, video, data, etc., has led to the rapid growth of numerous transmission systems. For example, direct to home (DTH) satellite systems and cable systems have been deployed to compete with traditional broadcast networks. Similarly, broadband data networks, such as for example, digital subscriber line (DSL) networks and cable modem data networks have been deployed to provide high speed point-to-point data communication. Generally, the broadcast-type networks are very efficient at transmitting data items, particularly video, to a large number of viewers, but lack the capability to target specific viewers. Broadband data networks, by comparison, are very good at transmitting content to small numbers of discrete viewers and are not as efficient at simultaneously reaching large numbers of viewers.

Thus, there are numerous content transmission systems now available that did not exist even a few years ago. Applicants have noted, however, that systems and methods have not been implemented for integrating the selective use of these different systems to leverage their respective strengths. More specifically, existing systems and methods lack the capability to select the single network from a plurality of transmission networks that can most efficiently transfer a content item at a given time. Such a system or method would enable operators of transmission networks to best utilize network resources, thereby lowering costs of operation and lowering prices for consumers.

SUMMARY OF THE INVENTION

Accordingly, systems and methods for content transmission are disclosed. In systems in accordance with an illustrative embodiment of the invention, viewers enter requests for content items such as, for example, videos, at their set top box. Requests contain information such as the geographic location to which the content is to be transmitted, the time at which the viewer desires to view the content, and a price the viewer is willing to pay for the content.

The requests are transmitted over a broadband network, a back channel to a broadcast network, or both to a transmission network selector. The transmission network selector determines whether the content will be transmitted over a broadcast network or a broadband network. This determination is based on the information provided with the transmission request, information about the content itself, and information about the broadcast and broadband networks. Information about the content may comprise, for example, the duration of the content and the required bandwidth for transmission of the content. Information about the broadcast and broadband networks may comprise, for example, the available bandwidth on the networks, the geographic boundaries of the networks, and the cost of transmission at a given time of day on the networks.

Once a transmission network has been selected, the transmission network selector forwards a transmission notification to the viewer indicating the time the requested item will be transmitted and the transmission network over which it will be transmitted. Thereafter, the content is transmitted to the viewer.

BRIEF DESCRIPTION OF THE DRAWINGS

The present invention will be better understood after reading the following detailed description of an illustrative example thereof with reference to the appended drawings, in which.

DETAILED DESCRIPTION

Figure 1:
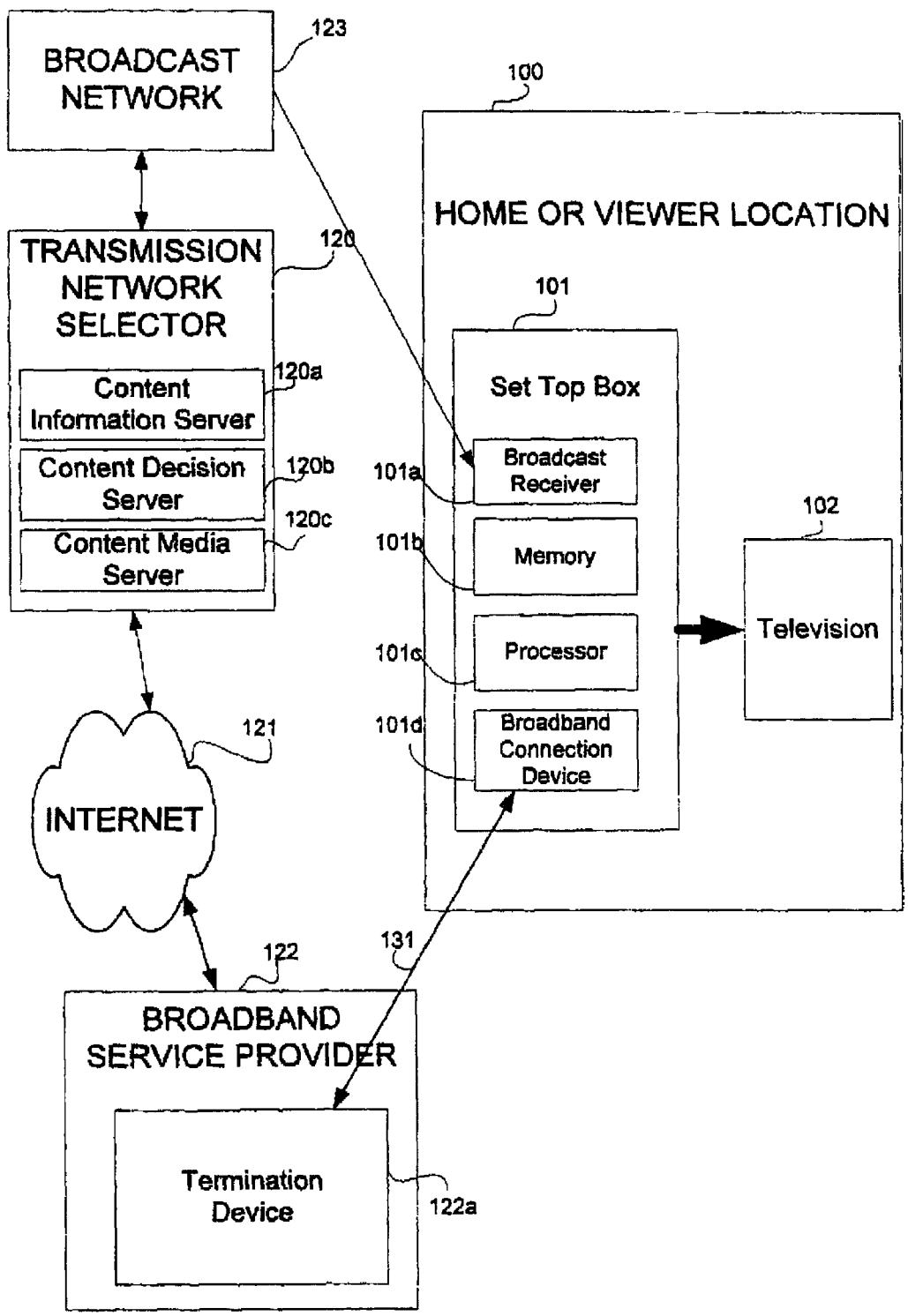
FIG. 1 is a block diagram of a system for network transmission selection in accordance with an aspect of the invention.

An illustrative example of a system which meets the above-mentioned objects and provides other beneficial features will be described below with reference to FIGS. 1-4. Those skilled in the art will readily appreciate that the description given herein with respect to those figures is for explanatory purposes only and is not intended in any way to limit the scope of the invention. Throughout the description, like reference numerals will refer to like elements in the respective figures.

FIG. 1 is a diagram of a system incorporating an illustrative transmission network selection system in accordance with an aspect of the invention. At viewer location 100, viewers receive an identification from broadcast content source 123 that content items such as, for example, movies are available to the viewer upon request. When a viewer selects to view an item, the selection is transmitted either via broadband service provider 122 and Internet 121 or via a back channel of broadcast network 123 to transmission network selector 120. Transmission network selector 120 automatically determines whether to transmit the requested content via broadcast network 123 or to download the content item over broadband source 122. Once the determination has been made, network selector 120 forwards the content item to the viewer location 100 via the selected network.

As shown in FIG. 1, home or viewer location 100 contains a viewer device 101 that provides a video input to television 102. Viewer device 101 can be a set top box, a personal computer, or any electronic device capable of receiving, storing, and processing video signals. Viewer device 101 comprises a broadcast receiver 101a for receiving video from a broadcast network such as, for example, a DTH satellite network, a terrestrial wireless network, or a cable television broadcast network. Memory 101b may be a hard disk drive (HDD) or any memory device that enables the viewer device to store previously transmitted content, information about the content, and information about the transmission of the content. Processor 101c enables the viewer device to perform operations such as displaying a list of available content items from which a viewer may make a transmission request. Broadband connection device 101d provides connectivity to broadband service provider 122 and may be, for example, a DSL modem or cable modem.

Broadband service provider 122 provides a broadband connection between viewer device 101 and transmission network selector 120. Broadband service provider 122 may be, for example, a DSL service provider, or the like. Generally, service provider 122 receives high-speed connections 131 from viewer device 101 and provides access to transmission network selector 120 usually via Internet 121. As shown, service provider 122 comprises a termination device 122a for receiving a communication connection from viewer device 100. Device 122a may be, for example, a DSL modem.

Broadcast network 123 may be, for example a DTH satellite provider. Broadcast content is transmitted from transmission network selector 120 to viewer device 101 over broadcast network 123. Viewer device 101 contains broadcast receiver 101a to receive broadcast content. Data is also transmitted from viewer device 101 to transmission network selector 120 over a back channel of broadcast network 123 such as, for example, a dial-up modem.

Transmission network selector 120 operates to determine whether to transmit video content to a viewer via a traditional broadcast network 123 or via broadband provider 122. Transmission network selector 120 comprises content information server 120a, content decision server 120b, and content media server 120c. Content information server 120a transmits to viewer device 101a list of available content items from which the viewer can make a request. Content decision server 120b receives the viewer's request for a content item, selects a network over which to transmit the content, and forwards a transmission notification to viewer device 101. Finally, content media server 120c queues and transmits the content to the selected transmission network. If the content is to be transmitted over broadcast network 123, content media server 120c transmits content to broadcast content transmitter, which, in turn, transmits the content over broadcast network 123 to broadcast receiver 101a in viewer device 101. Alternatively, the content may be transmitted over broadband network 122 to viewer device 101.

Figure 2:
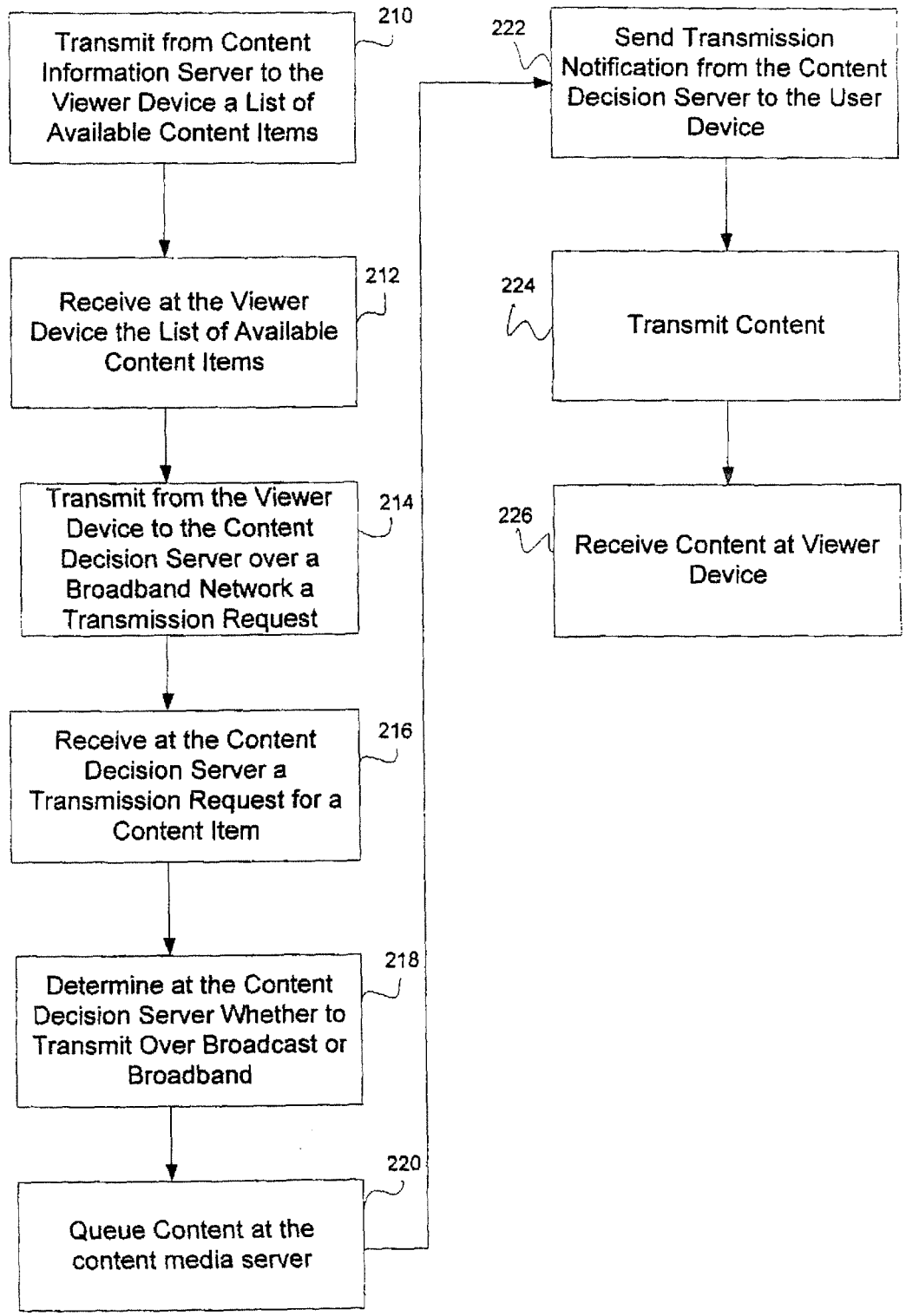
FIG. 2 is a flow chart of a method for network transmission selection in accordance with the present invention.

FIG. 2 illustrates a flow chart of a method for content transmission network selection in accordance with an aspect of the invention. At step 210 a list of available content items such as, for example, movies or television programs is transmitted from content information server 120a to viewer device 101. The list may be downloaded via broadcast content source 123 or broadband provider 122. At step 212, the list of available content items is received at the viewer device. The viewer may then review the list of movies and select the one(s) he or she desires to view. The viewer may also indicate when he or she desires to view the video, the price he or she is willing to pay for the video, the geographic location to which the video is to be sent, as well as other information about the transmission request. At step 214, a request for one of the videos is transmitted from viewer device 101 to content decision server 120 either via broadband network 122 or via a back channel of broadcast network 123. At step 216, the transmission request is received at content decision server 120.

At step 218, content decision server 120 automatically determines whether to transmit content using a broadcast network or a broadband network. This determination is based upon the characteristics of the transmission request, the characteristics of the content to be transmitted, the characteristics of the broadcast network, the characteristics of the broadband network, and the nature and volume of all other requests. The characteristics of the transmission request may include, for example, the geographic location to which the content is to be transmitted, the time at which the content is expected to be viewed, a dollar amount that the viewer is willing to pay for the content, or any other information about the transmission request that would be helpful in selecting a transmission network for the requested content. Characteristics of the content to be transmitted that may influence the network selection include, for example, the size and/or duration of the content, the required bandwidth for transmission of the content, features to be present with the content such as, for example, fast forward, rewind, and VCR controls, the number of requests for identical content from different viewers, or any other information about the content that would be helpful in selecting a transmission network for the requested content. Characteristics of the broadcast network that may influence the determination include, for example, the available bandwidth on the network, the geographic boundaries of the network, the cost of transmission at a given time of day on the network, or any other information about the broadcast network that would be helpful in selecting a transmission network for the requested content. The characteristics of the broadband network may include the scheduled or predicted available bandwidth on the network, the geographic boundaries of the network, the cost of transmission at a given time of day on the network, or any other information about the broadband network that would be helpful in selecting a transmission network for the requested content.

At step 220, content is queued at content media server 120c. Content media server 120c aggregates the content to be transmitted and formats the content for the selected transmission network. Formatting content for transmission over the selected network involves choosing a means to encapsulate the content for the selected network topology while addressing security as well as other factors. For example, a movie file stored in MPEG format may be packaged for DTH satellite broadcast by encapsulating the file in a DVB compliant spooler file which may then be routed through a transport multiplexor that applies real-time broadcast conditional access. Packaging for transmission over a broadband network such as a DSL network may include encapsulation into a TCP/IP packet stream which is encrypted and copy-protected and routed through a secure ATM switch fabric to the viewer device using secure sockets. Once the content has been formatted, content media server 120c transmits the resulting data stream to the appropriate transmission network. At step 222, a notification of the transmission characteristics of the content is transmitted from content decision server 120b to viewer device 101 over broadband network 122. Transmission characteristics of the content may include, for example, the time of transmission, the selected transmission network, network specific information such as the DTH transponder frequency and polarity, stream ID's and encryption/decryption codes, or any other information helpful or necessary for transmission. DTH transponder frequency and polarity is used to tune the DTH receiver to the correct transponder frequency. Stream ID's are used to identify which packets to extract in the selected MPEG multiplex stream. Decryption keys are used to decrypt data. Viewer device 101 utilizes the transmission characteristics to identify which of the connected networks to monitor for the content, how to isolate the specific content on the selected network, and how to process any security measures.

At step 224, the content is transmitted over broadcast network 123 or broadband network 122. Each content item may be sent directly to the viewer device, or, depending on the topology of the selected network, the content item may first be sent to a staging server. At step 226, viewer device 101 receives the content. If the content is being broadcast, viewer device 101 will tune to the appropriate broadcast channel or DTH transponder frequency. If the content is being transmitted over a broadband network, the viewer device will download the content through broadband connection device 101*d*.

Figure 3:
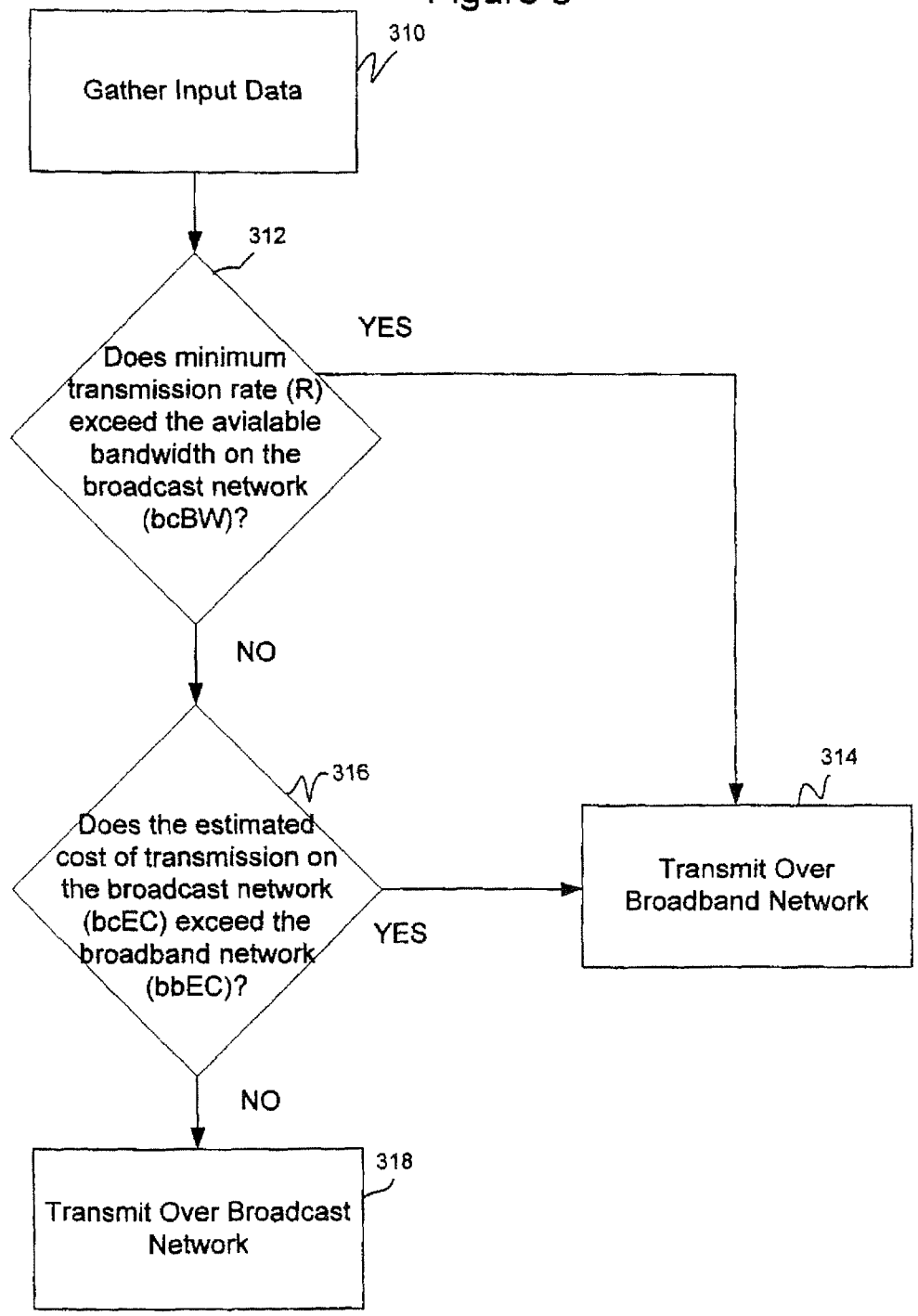
FIG. 3 is a flow chart of an illustrative example of the steps involved in the step of determining at the content decision server whether to transmit over a broadcast or a broadband network.

FIG. 3 is a flow chart of an illustrative example of a process for determining whether to transmit data over a broadcast or a broadband network. At step 310, content decision server 120*b* gathers input data comprising the characteristics of the transmission request, the characteristics of the content to be transmitted, and the characteristics of the broadcast network and broadband networks. For example, characteristics of the transmission request may include the time (T) that the content is requested to be viewed. Characteristics of the content to be transmitted may include the number of requests for the content (N), the size of the content in megabites (S), and the minimum transfer rate for the content (R). Characteristics of the broadband network may include the cost of transport per megabite on the broadband network (bbC) and the estimated cost of transport on the broadband network (bbEC). The estimated cost of transport on the broadband network is equal to the product of the size of the content in megabites and the cost of transport per megabite on the broadband network (bbEC=S*bbC). Finally, characteristics of the broadcast network may include the cost of transport per megabite on the broadcast network (bcC), the available bandwidth on the broadcast network (bcBW), and the estimated cost of transport on the broadcast network (bcEC). The estimated cost of transport on the broadcast network is equal to the product of the size of the content in megabites and the cost of transport per megabite on the broadcast network (bcEC=S*bcC).

At step 312, content decision server 120*b* determines whether the available bandwidth on the broadcast network (bcBW) is less than the minimum transfer rate for the content (R). If the available bandwidth on the broadcast network (bcBW) is less than the minimum transfer rate for the content (R), which indicates that there is not enough available bandwidth on the broadcast network, then at step 314 content decision server 120*b* determines that content will be transmitted over the broadband network. If the available bandwidth on the broadcast network (bcBW) is not less than the minimum transfer rate for the content (R), then at step 316 content decision server determines whether the estimated cost of transport on the broadband network (bbEC) is less than the estimated cost of transport on the broadcast network (bcEC). If the estimated cost of transport on the broadband network (bbEC) is less than the estimated cost of transport on the broadcast network (bcEC), then at step 314 content decision server 120*b* determines that content will be transmitted over a broadband network. If the estimated cost of transport on the broadband network (bbEC) is not less than the estimated cost of transport on the broadcast network (bcEC), then at step 318 content decision server 120*b* determines that content will be transmitted over a broadcast network.

The process described above in connection with FIG. 3 is for illustrative purposes and may be expanded to incorporate other variables such as, for example, the time (T) that content is desired to be viewed. If the viewer does not require the content to be viewed immediately, then the transmission of the content may be scheduled for the time at which the cost of transmission is lowest. For example, the viewer may request delivery for the next day, which would enable delivery at night when transmission costs are likely to be low. Similarly, a "trickle stream", i.e. transmitting data at a slow speed over a long period of time, may also be employed to preserve available bandwidth on a given network.

Figure 4:
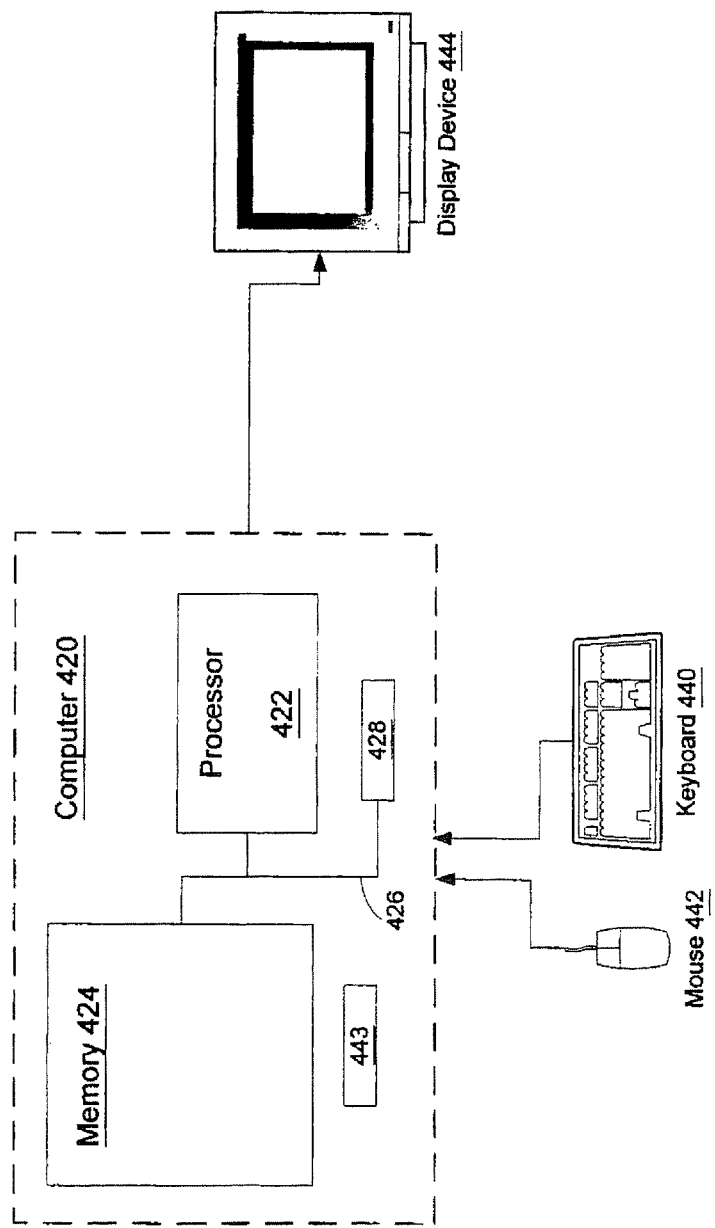
FIG. 4 is a block diagram of a computing device for use in a system in accordance with the invention.

Those skilled in the art will recognize that content information server 220*a*, content decision server 220*b*, content media server 220*c*, and viewer device 101 may comprise an appropriately programmed computing device. FIG. 4 is a block diagram of a generic computing system suitable for use in a system in accordance with the present invention. As shown, computing device 420 includes processing unit 422, system memory 424, and system bus 426 that couples various system components including system memory 424 to the processing unit 422. The system memory 424 might include read-only memory (ROM) and random access memory (RAM). The system might further include hard-drive 428, which provides storage for computer readable instructions, data structures, program modules and other data. A viewer may enter commands and information into the computer 420 through input devices such as a keyboard 440 and pointing device 442 which may be, for example, a mouse or remote control. A monitor 444 or other type of display device is also connected to the system for output. Communications device 443, which in one embodiment may be a modem, provides for communications over a network such as, for example, broadband network 131 and the Internet 121. Processor 422 can be programmed with instructions to interact with other computing systems so as to perform the algorithms described above with reference to FIGS. 2 and 3. The instructions may be received from networks 121 and 131 or stored in memory 424 and/or hard drive 428. Processor 422 may be loaded with any one of several computer operating systems such as Windows NT, Windows 2000, or Linux.

Thus, there has been disclosed systems and methods for selecting a transmission network. Systems and methods in accordance with the present invention enable network operators to best utilize network resources while providing the desired service.

Those skilled in the art understand that computer readable instructions for implementing the above described processes, such as those described with reference to FIGS. 2 and 3, can be generated and stored on one of a plurality of computer readable media such as a magnetic disk or CD-ROM. Further, a computer such as that described with reference to FIG. 4 may be arranged with other similarly equipped computers in a network, and each computer may be loaded with computer readable instructions for performing the above described processes. Specifically, referring to FIG. 4, microprocessor 422 may be programmed to operate in accordance with the above-described processes.

While the invention has been described and illustrated with reference to specific embodiments, those skilled in the art will recognize that modification and variations may be made without departing from the principles of the invention as described above and set forth in the following claims. For example, while the invention has been described as being used to determine whether to transmit content over a DSL network or a DTH satellite network, the invention might also be used to determine whether to transmit content over any broadband network such as, for example, a cable system or any broadcast network such as, for example, a wireless network using modulated frequency signals. Furthermore, the list of available content items, the viewer's content transmission request, and the transmission notification may be transmitted between the transmission network selector and the viewer device using any broadband network. Accordingly, reference should be made to the appended claims as indicating the scope of the invention.

What is claimed:

1. A method for providing video content, the method comprising:
   receiving, by a transmission network selector comprising a processor, a transmission request from equipment located at a viewer location, wherein a first data coupling is available between the equipment at the viewer location and the transmission network selector through a broadcast network and a second data coupling is available between the equipment at the viewer location and the transmission network selector through a broadband network, wherein the broadcast network and the broadband network are different networks, and wherein the transmission request comprises a request for video content;
   selecting, by the transmission network selector, one of the first data coupling through the broadcast network or the second data coupling through the broadband network as a selected data coupling for transmission of the video content to the equipment at the viewer location based on characteristics of the video content, wherein each of the first data coupling and the second data couplings is available to transmit the video content to the equipment at the viewer location responsive to the transmission request;
   transmitting, by the transmission network selector, a notification to the equipment at the viewer location, wherein the notification comprises an identification of the selected data coupling; and
   after the transmitting of the notification, transmitting, by the transmission network selector, the video content from the transmission network selector to the equipment at the viewer location according to the selected data coupling.

2. A method according to claim 1 wherein the broadcast network comprises a satellite network, and the broadband network comprises a coupling over a digital subscriber line, and the selecting of the one of the first data coupling through the broadcast network or the second data coupling through the broadband network is further based on a feature selected from a group consisting of characteristics of the transmission request, characteristics of the broadcast network, characteristics of the broadband network, other transmission requests received by the transmission network selector and combinations thereof.

3. A method according to claim 2 wherein the notification comprises a satellite transponder attribute selected from a group consisting of a satellite transponder frequency, a satellite transponder polarity and combinations thereof.

4. A method according to claim 2 wherein the notification comprises a stream identification used to identify packets to extract in a stream.

5. A method according to claim 2 wherein the transmitting of the video content comprises encapsulating the video content in a compliant spooler file to provide real-time broadcast conditional access.

6. A method according to claim 2 wherein the notification comprises a time of transmission of the video content.

7. A method according to claim 1 wherein the transmitting of the video content comprises transmitting the video content through the broadcast network using real-time conditional access.

8. A method according to claim 1 wherein the transmitting of the video content comprises trickle streaming the video content through the broadband network.

9. A method claim 1 wherein the characteristics of the video content comprises fast forward and rewind control features associated with the video content.

10. A method according to claim 1 further comprising:
    before the selecting of the one of the first data coupling through the broadcast network or the second data coupling through the broadband network, determining, by the transmission network selector, a first scheduled available bandwidth on the broadband network and a second scheduled available bandwidth on the broadband network responsive to receiving the transmission request; and
    wherein the second scheduled available bandwidth on the broadband network is greater than the first scheduled available bandwidth on the broadband network.

11. A method according to claim 1,
    wherein the first data coupling comprises a data coupling between the equipment at the viewer location and the transmission network selector through a satellite of the broadcast network,
    wherein the notification comprises a satellite transponder attribute selected from a group consisting of a satellite transponder frequency, a satellite transponder polarity and combinations thereof, and wherein the notification comprises a time of transmission of the video content,
    wherein, in response to the selecting of the first data coupling through the broadcast network, the transmitting of the video content comprises encapsulating the video content in a compliant spooler file to provide real-time broadcast conditional access, and
    wherein, in response to the selecting of the second data coupling through the broadband network, the notification comprises a stream identification used to identify packets to extract in a stream and a time of transmission of the video content.

12. A method according to claim 2,
    wherein the transmitting of the video content comprises trickle streaming the video content through the broadband network including the digital subscriber line, and
    wherein the transmission request comprises fast forward, rewind, and video cassette recorder controls.

13. A method according to claim 12 further comprising:
    before the selecting of the first data coupling for transmission of the video content, determining, by the transmission network selector, a first scheduled available bandwidth on the broadband network responsive to receiving the transmission request; and
    before the selecting of the second data coupling for transmission of the video content, determining, by the transmission network selector, a second scheduled available bandwidth on the broadband network responsive to receiving the transmission request,
    wherein the second scheduled available bandwidth on the broadband network is greater than the first scheduled available bandwidth on the broadband network.

14. A method according to claim 1,
    wherein the second data coupling comprises a data coupling between the equipment at of the viewer location and the transmission network selector through a digital subscriber line of the broadband network,
    wherein the notification comprises a stream identification used to identify packets to extract in a stream and a time of transmission of the video content, and
    wherein transmitting the video content comprises encapsulating the video content into a transmission control protocol internet protocol packet stream.

15. A method according to claim 1, wherein the selecting of the one of the first data coupling or the second data coupling is at least in part responsive to a respective estimated cost of transmission through each of the first data coupling and the second data coupling.

16. A device, comprising:
a memory storing computer instructions; and
a processor in communication with the memory, wherein the processor, responsive to executing the computer instructions, performs operations comprising:
receiving a transmission request from equipment located at a viewer location, wherein a first data coupling is available between the equipment at the viewer location and a transmission network selector through a broadcast network and a second data coupling is also available between the equipment at the viewer location and the transmission network selector through a broadband network, wherein the broadcast and broadband networks are different, and wherein the transmission request comprises a request for video content;
selecting one of the first data coupling through the broadcast network or the second data coupling through the broadband network as a selected data coupling for transmission of the video content to the equipment at the viewer location based on characteristics of the video content, wherein each of the first data coupling and the second data coupling is available to transmit the video content to the equipment at the viewer location responsive to the transmission request;
transmitting a notification to the equipment at the viewer location, wherein the notification comprises an identification of the selected data coupling; and
after the transmitting of the notification, transmitting the video content from the transmission network selector to the equipment at the viewer location through the selected data coupling.

17. A device according to claim 16, wherein the processor further performs operations comprising:
before the selecting of the first data coupling for transmission of the video content, determining a first scheduled available bandwidth on the broadband network responsive to receiving the transmission request; and
before the selecting of the second data coupling for transmission of the video content, determining a second scheduled available bandwidth on the broadband network responsive to receiving the transmission request,
wherein the second scheduled available bandwidth on the broadband network is greater than the first scheduled available bandwidth on the broadband network.

18. A device according to claim 16, wherein the processor further performs operations comprising determining a respective estimated cost of transmission through each of the first data coupling and the second data coupling, wherein automatically selecting one of the first data coupling and the second data coupling is accomplished in consideration of the respective estimated of cost transmission.

19. A computer-readable storage device, comprising computer instructions which, responsive to being executed by a processor, cause the processor to perform operations comprising:
receiving a transmission request from equipment located at a viewer location, wherein a first data coupling is available between the equipment at the viewer location and a transmission network selector through a broadcast network and a second data coupling is also available between the equipment at the viewer location and the transmission network selector through a broadband network, wherein the broadcast and broadband networks are different, and wherein the transmission request comprises a request for video content;
automatically selecting one of the first data coupling through the broadcast network or the second data coupling through the broadband network as a selected data coupling for transmission of the video content to the equipment at the viewer location based on characteristics of the video content, wherein each of the first data coupling and the second data coupling is available to transmit the video content to the equipment at the viewer location responsive to the transmission request;
transmitting a notification from the transmission network selector to the equipment at the viewer location, wherein the notification comprises an identification of the selected data coupling; and
after the transmitting of the notification, transmitting the video content from the transmission network selector to the equipment at the viewer location through the selected data coupling.

20. A computer-readable storage device according to claim 19, wherein the processor further performs operations comprising determining a respective estimated cost of transmission through each of the first data coupling and the second data coupling, wherein selecting one of the first data coupling and the second data coupling is accomplished consideration of the respective estimated of cost transmission.

* * * * *